United States Patent
Choudhary et al.

(10) Patent No.: US 11,528,084 B2
(45) Date of Patent: Dec. 13, 2022

(54) DISTRIBUTED NETWORK TIME PROTOCOL

(71) Applicant: Huawei Technologies Co., Ltd., Shenzhen (CN)

(72) Inventors: Vikram Choudhary, Bengaluru (IN); Ankit Kumar Sinha, Bengaluru (IN); Hui Ni, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

(21) Appl. No.: 17/018,593

(22) Filed: Sep. 11, 2020

(65) Prior Publication Data

US 2020/0412470 A1 Dec. 31, 2020

Related U.S. Application Data

(63) Continuation of application No. PCT/CN2019/077841, filed on Mar. 12, 2019.

(30) Foreign Application Priority Data

Mar. 14, 2018 (IN) .............................. 201831009361

(51) Int. Cl.
*H04J 3/06* (2006.01)
*H04L 61/4511* (2022.01)

(52) U.S. Cl.
CPC .......... *H04J 3/0644* (2013.01); *H04J 3/0667* (2013.01); *H04L 61/4511* (2022.05)

(58) Field of Classification Search
CPC .................................................... H04J 3/0644
See application file for complete search history.

(56) References Cited

U.S. PATENT DOCUMENTS

| 6,810,411 | B1 | 10/2004 | Coughlin et al. |
| 9,246,762 | B1* | 1/2016 | Watkins ............... H04J 3/0641 |
| 11,082,393 | B2* | 8/2021 | Goel .................... H04L 61/106 |
| 11,197,075 | B1* | 12/2021 | Kamen .............. G06F 11/2082 |

(Continued)

FOREIGN PATENT DOCUMENTS

| CN | 101232395 A | 7/2003 |
| CN | 102088397 A | 6/2011 |

(Continued)

OTHER PUBLICATIONS

Gayraud, R., et al., "Network Time Protocol (NTP) Server Option for DHCPv6", Internet Engineering Task Force (IETF), Request for Comments: 5908, Jun. 2010, 9 Pages.

(Continued)

*Primary Examiner* — Guang W Li
(74) *Attorney, Agent, or Firm* — Slater Matsil, LLP

(57) ABSTRACT

A method and system for enhanced time synchronization with lesser delay and jitter, from a gateway of a network or an external standard time source, over the internet, in a traditional network, including SDN, by NTP clients like newly added devices, spawned VMs and the like, by automatic deployment of the distributed NTP service through DHCP and DNS servers by spawning NTP demons (ntpd), according to the time synchronization requests received, thereby offloading the NTP functionality of the gateway and decreasing NTP traffic.

21 Claims, 9 Drawing Sheets

(56) References Cited

U.S. PATENT DOCUMENTS

| | | | |
|---|---|---|---|
| 2004/0028162 A1* | 2/2004 | Skahan, Jr. | H04L 69/28 375/356 |
| 2009/0216852 A1 | 8/2009 | Filippi | |
| 2010/0007387 A1* | 1/2010 | Chang | H03K 7/08 327/131 |
| 2010/0023638 A1* | 1/2010 | Bowman | H04L 65/80 709/231 |
| 2010/0074278 A1* | 3/2010 | Dobjelevski | H04J 3/0697 370/503 |
| 2011/0110360 A1* | 5/2011 | Fenwick | H04J 3/0673 370/350 |
| 2011/0274037 A1* | 11/2011 | Jain | H04W 8/085 370/328 |
| 2016/0112182 A1* | 4/2016 | Karnes | G06F 1/14 375/362 |
| 2016/0112269 A1* | 4/2016 | Singh | H04L 41/0853 709/224 |
| 2017/0357674 A1 | 12/2017 | Hsieh et al. | |
| 2019/0056972 A1* | 2/2019 | Zhou | G06F 11/3476 |
| 2019/0243915 A1* | 8/2019 | Raghavan | H04L 43/08 |
| 2019/0261439 A1* | 8/2019 | Itagaki | H04W 76/14 |
| 2020/0412470 A1* | 12/2020 | Choudhary | H04L 41/0806 |
| 2021/0377135 A1* | 12/2021 | Nazar | H04L 43/04 |

FOREIGN PATENT DOCUMENTS

| | | | |
|---|---|---|---|
| CN | 103078699 | A | 5/2013 |
| CN | 103634091 | A | 3/2014 |
| CN | 103997432 | A | 8/2014 |
| CN | 104935392 | A | 9/2015 |
| CN | 105119679 | A | 12/2015 |
| CN | 105119679 | A * | 12/2015 |
| CN | 105159728 | A | 12/2015 |
| CN | 105577349 | A | 5/2016 |
| CN | 106911532 | A | 6/2017 |
| CN | 107017958 | A | 8/2017 |
| EP | 1593277 | A1 | 11/2005 |
| JP | 2007310522 | A | 11/2007 |
| WO | 2004015889 | A1 | 2/2004 |
| WO | 2004086790 | A1 | 10/2004 |
| WO | 2018040793 | A1 | 3/2018 |

OTHER PUBLICATIONS

Mills, D., et al., "Network Time Protocol Version 4: Protocol and Algorithms Specification", Internet Engineering Task Force (IETF), Request for Comments: 5905, Obsoletes: 1305, 4330, Jun. 2010, 110 Pages.

Mills, D., "Network Time Protocol (Version 3), Specification, Implementation and Analysis", Network Working Group, Request for Comments: 1305, Obsoletes: RFC-1119, RFC-1059, RFC-958, Mar. 1992, 120 Pages.

SDXCentral Studios, "Understanding the SDN Architecture—SDN Control Plane & SDN Data Plane", Topic Hub/SDN, Mar. 13, 2015, 4 Pages.

SDXCentral Studios, "An Overview of NFV Elements", Topic Hub/NFV, Jul. 9, 2015, 3 Pages.

Murta et al., "Characterizing Quality of Time and Topology in a Time Synchronization Network", Proceedings of the Global Telecommunications Conference, GLOBECOM '06, Nov. 27-Dec. 1, 2006, 5 pages.

Xiao et al., "Design and implementation of a time synchronized IoT devices based on NTP", Journal of Shaoyang University (Natural Science Edition), vol. 13, No. 3, Sep. 2016, 6 pages. (Translation of Abstract only.).

Quesada, J., et al., "Evaluation of Clock Synchronization Methods for Measurement and Control using Embedded Linux SBCs", 2012 9th International Conference on Remote Engineering and Virtual Instrumentation (REV), Jul. 4-6, 2012, 7 Pages, Bilbao, Spain.

"NGP Next Generation Protocol; Packet Routing Technologies", Group Report, ETSI GR NGP 003 V1.1.1, Mar. 2017, 56 Pages.

* cited by examiner

DISTRIBUTED NETWORK TIME PROTOCOL

CROSS-REFERENCE TO RELATED APPLICATIONS

This application is a continuation of International Application No. PCT/CN2019/077841, filed on Mar. 12, 2019, which claims priority to Indian Patent Application No. IN20831009361, filed on Mar. 14, 2018. The disclosures of the aforementioned applications are hereby incorporated by reference in their entireties.

TECHNICAL FIELD

The present subject matter described herein, in general, relates to network time protocol and more particularly to distributed network time protocol in a traditional network, including software defined network.

BACKGROUND

In modern computer networks, time synchronization is critical because every aspect of managing, securing, planning, and debugging a network involves determining the time of occurrence of events. Time also provides the only frame of reference between all devices on the network. Without synchronized time, accurately correlating log files between these devices is difficult, even impossible. Tracking security breaches, network usage, or problems affecting a large number of components can be nearly impossible if timestamps in logs are inaccurate. Time is often the critical factor that allows an event on one network node to be mapped to a corresponding event on another. To reduce confusion in shared file systems, it is important for the modification times to be consistent, regardless of what machine the file systems are on. Thus, a mechanism is required to disseminate accurate time around a network to computers and network devices in order to maintain order.

Network Time Protocol (NTP) is a protocol introduced to provide a mechanism for high degree of time synchronization of computer clock times in a network. It belongs to and is one of the oldest parts of the transmission control protocol/internet protocol (TCP/IP) suite. The term NTP applies to both the protocol and the client-server programs that run on computers. The NTP client initiates a time-request exchange with the NTP server. As a result of this exchange, the client is able to calculate the link delay and its local offset, and adjust its local clock to match the clock at the server's computer.

With the advent of enabling technologies like Software Defined Networking (SDN) that helps to meet growing demand in terms of traffic throughput as well as differentiated quality of service (QoS), time synchronization plays an important role. SDN realizes a network architecture whereby network control is decoupled from forwarding and is directly programmable, which enables underlying infrastructure to be abstracted for applications and network services, which can then treat the network as a logical or virtual entity.

In most traditional networks including SDN, the NTP clients synchronize time with either the gateway device or an external NTP standard time source.

As shown in FIG. 1, all of the new devices or spawned virtual machines ($VM_1$, $VM_2$, $VM_3$, . . . ) present inside a network synchronize the time with a gateway, which in turn synchronizes its time from external time source. With the spawning of new virtual machines, there rises a need for time synchronization with the gateway. As the number of VMs increase the gateway device gets overloaded with the time synchronization request packets from the VMs. Due to the above mentioned overloading, the gateway will be either unable to process the NTP time request packet of the VMs or it will be busy in sending reply for NTP packets and will be unable to carry out other functionalities.

In reference to FIG. 2, all or some of the already spawned virtual machines ($VM_1$, $VM_2$, $VM_3$, . . . ) present inside a network synchronize the time with an external clock source outside the network, over the internet or with the gateway, which can be a standard clock source. With the spawning of new VMs and their corresponding request to synchronize time with the external clock source, the NTP time request packets exchanged will increase, thereby utilizing more bandwidth for time synchronization.

When a new device is initialized or a new VM is spawned, time synchronization will be done with a server in one of the following methods. In one method, the newly added device or spawned VM will read the network configuration file and accordingly choose the time source with which the synchronization is done.

In another method, the newly added device or spawned VM will run a dynamic host control protocol (DHCP) client protocol, thereby sending an IP address request packet to DHCP server. Upon receiving the IP address request packet, DHCP server allocates an available IP address to the newly added device or spawned VM. DHCP further uses an option and associated sub-options to provide NTP for time synchronization of the newly added device or spawned VM.

The methods of time synchronizing mentioned herein above, fail to address the demand of time synchronization of the newly added devices or spawned VMs in a big data center, wherein scaling has no limit, thereby increasing the load and network traffic and synchronizing time from the same source proves to be a bottleneck.

The above described deficiencies of time synchronization in a network including SDN, based big data center, where scaling has no limit, are merely intended to provide an overview of some of the problems of conventional systems/mechanism/techniques, and are not intended to be exhaustive. Other problems with conventional systems/mechanism/techniques and corresponding benefits of the various non-limiting embodiments described herein may become further apparent upon review of the following description.

SUMMARY

This summary is provided to introduce concepts related to method and system for enhanced time synchronization in a traditional as well as SDN network.

Accordingly, an aspect of the present invention is to provide a method of time synchronization in a network, said method comprising: obtaining, by at least one of NTP clients in a network node, IP address or, optionally domain name of a Network Time Protocol (NTP) demon (ntpd) to synchronize time with; and synchronizing the time of the NTP client with the time of the NTP demon (ntpd), wherein the time of the NTP demon (ntpd) is synchronized with a gateway of a network or an external time source present over the internet.

Accordingly, an aspect of the present invention is to provide a system comprising of a gateway device and processor communicably coupled to cooperate and configured to enhance time synchronization in a traditional network, including SDN, based data center, wherein at least one newly added device or spawned VM in a compute node, receiving a packet with an available IP address, from a DHCP server in a network node, receiving a packet, by the newly added device or spawned VM in the compute node, wherein the packet comprises the IP address or optionally the domain name of a Network Time Protocol (NTP) server, to synchronize time with, present in a configuration file provided by a SDN controller and synchronizing time with the NTP server. The NTP server with which the spawned VM synchronizes time is a spawned NTP demon (ntpd), which synchronizes its time with a gateway of the network or optionally with some external time source present over the internet.

Accordingly, another aspect of the present invention is to provide a method of time synchronization in a network comprising requesting to synchronize time with an external time source present over the internet or with a gateway, by at least one newly added device or spawned VM in a compute node, sending a IP resolution packet to a Domain Name System (DNS) server in a network node, by the newly added device or spawned VM to resolve the IP address of the external time source, receiving the IP address of a time source to synchronize time with, from a DNS proxy entry, by the newly added device or spawned VM and synchronizing time with the time source, wherein the IP address of the time source received from the DNS proxy entry is of a spawned NTP demon (ntpd), wherein the spawned ntpd synchronizes its time with the external time source present over the internet or with the gateway.

Accordingly, another aspect of the present invention is to provide a system comprising of a gateway device, at least one external standard time source and processor communicably coupled to cooperate and configured to enhance time synchronization in a traditional network, including SDN, based data center, wherein at least one newly added device or spawned VM in a compute node, requesting to synchronize time with an external standard time source, over internet, sending a IP resolution packet to a DNS server in a network node, by the newly added device or spawned VM to resolve the IP address of the external standard time source, receiving the IP address of a time source to synchronize time with, from a DNS proxy entry, by the newly added device or spawned VM and synchronizing time with the time source. The IP address of the time source received from the DNS proxy entry is of a spawned NTP demon (ntpd) which synchronizes its time with the external time source present over the internet or the gateway of the network.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

Figure 1:
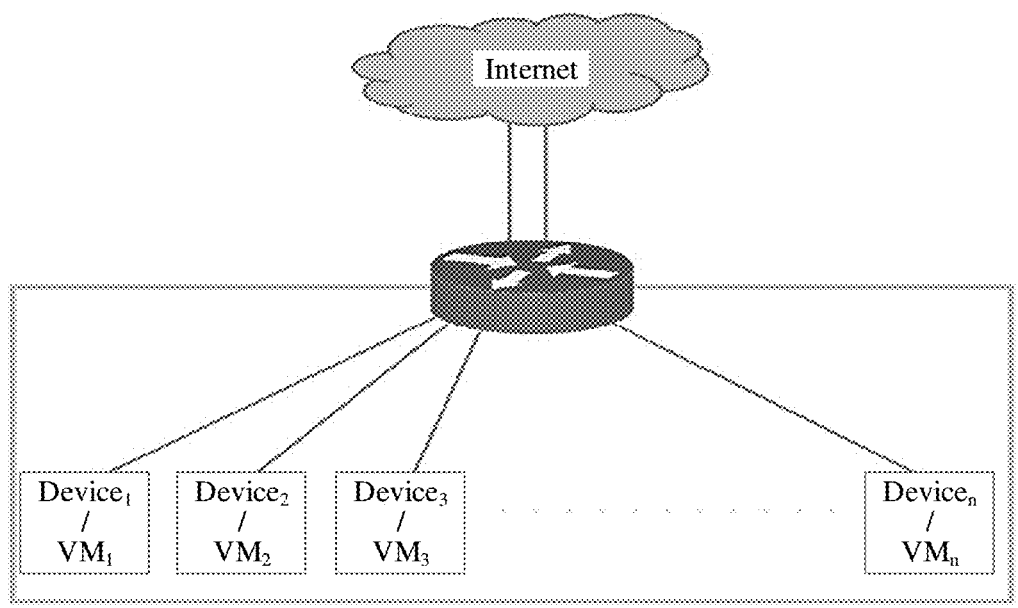
FIG. 1 illustrates the system for time synchronization from a gateway device, in a traditional network, including SDN, according to the related art.
Figure 2:
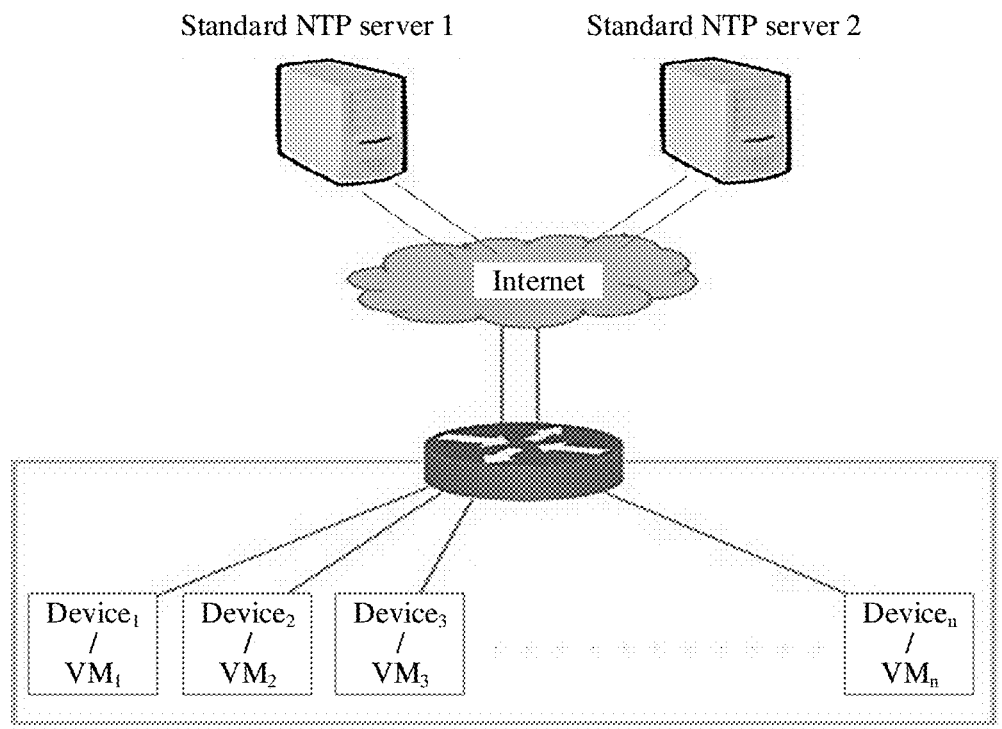
FIG. 2 illustrates the system for time synchronization from an external time source, over the internet, in a traditional network, including SDN, according to the related art.

It is to be understood that the attached drawings are for purposes of illustrating the concepts of the invention and may not be to scale.

DETAILED DESCRIPTION OF ILLUSTRATIVE EMBODIMENTS

The invention can be implemented in numerous ways, as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

System and method for time synchronization in a traditional network system including SDN based big data center, for a newly added device/spawned VM, thereby distributing the NTP functionality for enhanced bandwidth and gateway device functionality.

While aspects are described for system and method for time synchronization by the newly added device(s) or spawned VM(s), the present invention may be implemented in any number of different computing systems, environments, and/or configurations, the embodiments are described in the context of the following exemplary systems and methods.

Henceforth, embodiments of the present disclosure are explained with the help of exemplary diagrams and one or more examples. However, such exemplary diagrams and examples are provided for the illustration purpose for better understanding of the present disclosure and should not be construed as limitation on scope of the present disclosure.

Figure 4:
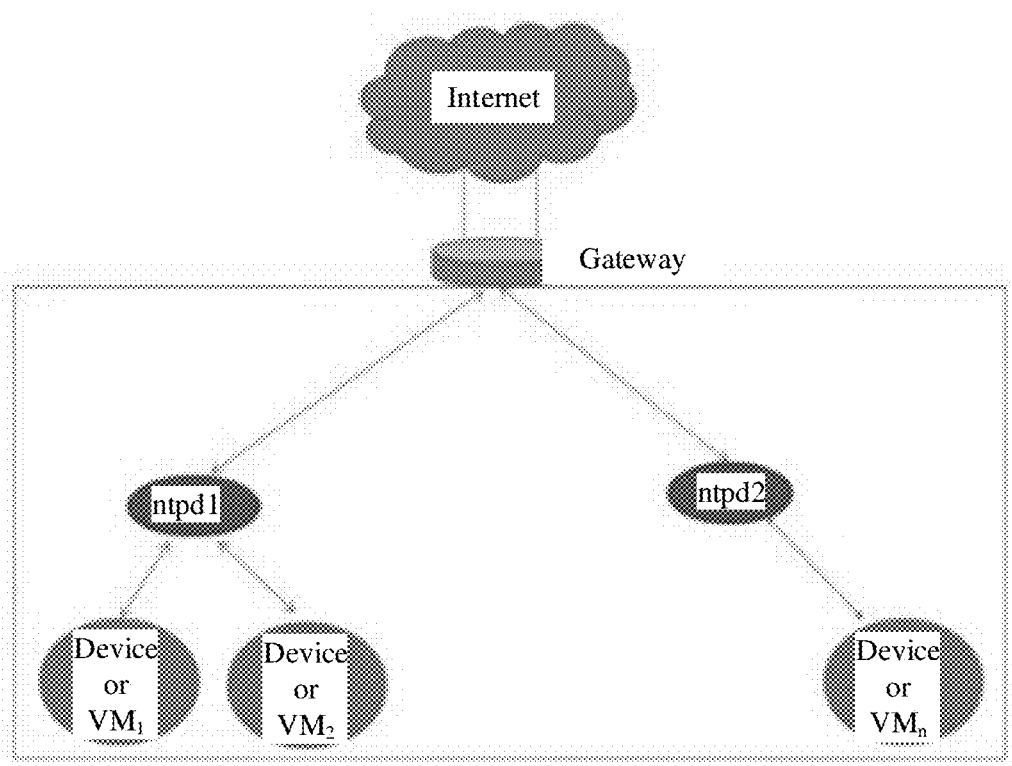
FIG. 4 illustrates the system for time synchronization of a newly added device or a spawned VM in a traditional network, including SDN, as a part of the technical solution provided in accordance to the present subject matter.

Referring to FIG. 4, technical solution to the aforementioned problems of the existing technology in a traditional network, including SDN based big data center has been disclosed. In order to handle the overloading of time synchronization request packets received by the gateway, from the newly added devices/spawned VMs or existing VMs, multiple NTP demons are spawned which act as NTP server(s) for the devices or spawned or existing VMs, thereby offloading the gateways NTP functionality. One NTP demon, which acts as a NTP server, handles a set of NTP clients like newly added devices or spawned VMs or existing VMs or the like.

NTP demon is spawned by the orchestrator or the SDN controller. On addition of a new device or a VM being spawned, the request for time synchronization leads to the spawning of one NTP demon. On further addition of devices or spawned VMs, new NTP demons are spawned when the existing NTP demon is insufficient to process the time synchronization request packets of the devices or spawned VMs. The maximum number of NTP clients that can synchronize time from the spawned NTP demon can be set for dynamic offloading.

Figure 3:
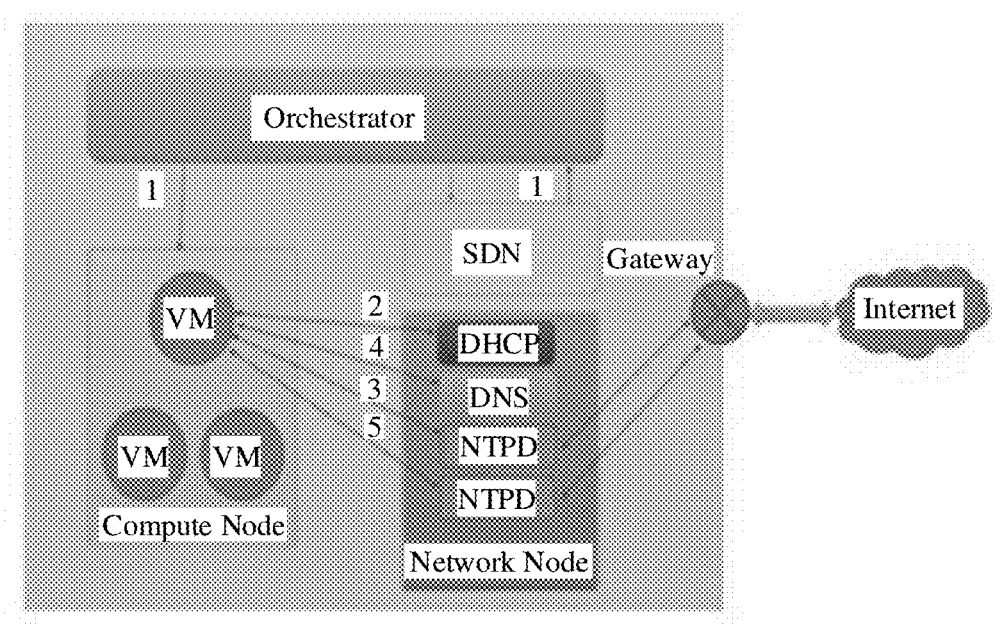
FIG. 3 illustrates a block diagram of the components of the system for time synchronization of a newly added device or a spawned VM in a traditional network, including SDN, in accordance to the present invention.

Referring to FIG. 3, illustrating a SDN, for time synchronization and the configurations between the individual components of the system. The compute node comprises of the newly added devices or the spawned VMs and the network node acts like a switch and caters to the need of the transferring packets in the network. The NTP demons for offloading of the gateway device's NTP functionality can be spawned anywhere in the data center i.e. either on the compute node or on the network node.

Figure 5:
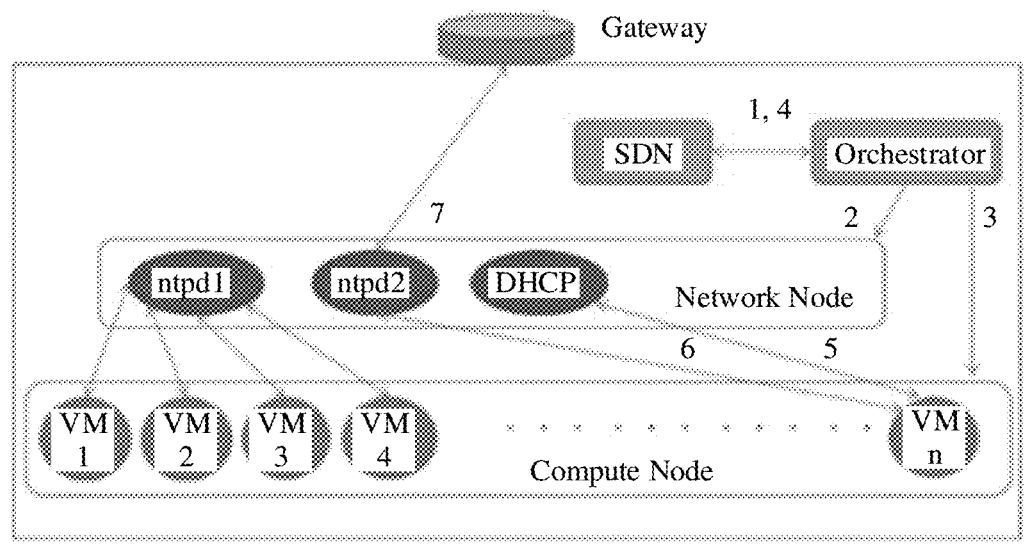
FIGS. 5 and 6 illustrate a schema of a system for time synchronization of a newly added device or a spawned VM in a traditional network, including SDN, wherein automatic deployment of distributed NTP service is done through a configuration file provided by SDN, where time synchronization takes place with a gateway.

Referring to FIG. 5, it illustrates a system with automatic deployment of distributed NTP service through a configuration file provided by SDN, in accordance to an embodiment of the subject matter of the present invention. On receiving a request to spawn a new VM, SDN controller sends a request to the orchestrator to spawn a new VM, $VM_N$. The SDN controller is further adapted to send the IP address of a NTP demon, in a configuration file, with which the spawned VM(s) will synchronize its time. Previously all the existing VMs ($VM_1$, $VM_2$, . . . $VM_{N-1}$) synchronized their time from a NTP demon ntpd1. If the number of VM(s) synchronizing their time from the available ntpds is under a specified limit, the spawned VM synchronizes its time with the IP address of the available NTP server, a ntpd, ntpd. DHCP allocates an available IP address to the newly spawned VM, on receiving a request from the newly spawned VM. $VM_N$ further sends a time synchronization request packet to the IP address of the available NTP demon provided in the configuration file, ntpd1, which synchronizes its time with the gateway and $VM_N$ synchronizes its time with the already available spawned ntpd, ntpd1.

In another embodiment, if all the ntpds available have reached their maximum limit of the number of VMs which can synchronize time from them, the SDN controller requests the orchestrator to spawn a new ntpd demon, ntpd2. The IP address of the ntpd2 is provided in the configuration file. On receiving confirmation after spawning of the new VM, $VM_N$ and new ntpd, ntpd2, from the orchestrator, the SDN controller controls the number of VM(s) that synchronizes time with the specific ntpd, thereby providing better load balancing. DHCP allocates an available IP address to the newly spawned VM, on receiving a request from the newly spawned VM. $VM_N$ further sends a time synchronization request packet to the IP address of the newly spawned NTP demon provided in the configuration file, ntpd2, which synchronizes its time with the gateway and synchronizes its time with the newly spawned ntpd, ntpd2. If the number of clients synchronizing time with a specific ntpd overloads the available ntpds, the SDN controller requests the orchestrator to spawn a new ntpd to facilitate time synchronization of the further spawned VMs, $VM_{N+1}$, $VM_{N+2}$, . . . and so on.

Figure 6:
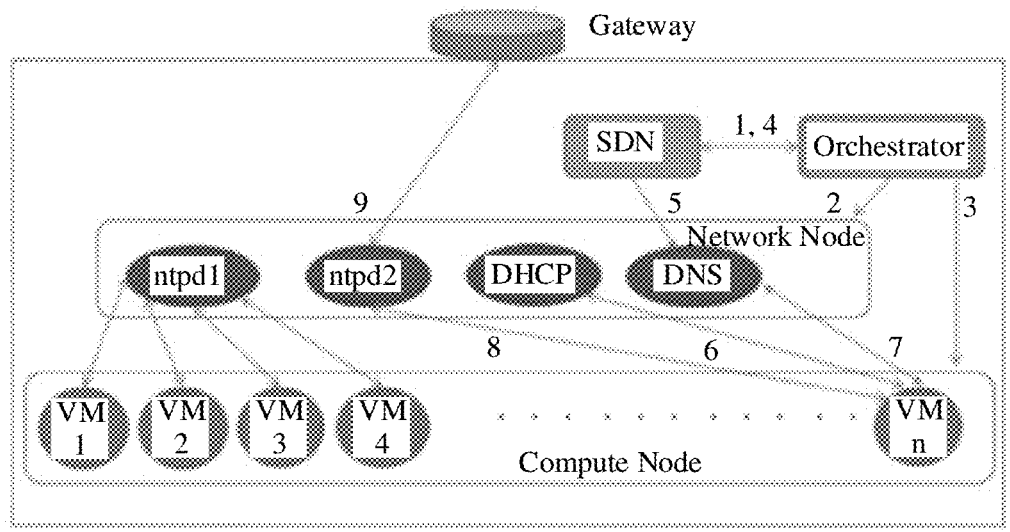

A system with automatic deployment of distributed NTP service, through a configuration file provided by SDN, has been illustrated in FIG. 6, in accordance to an embodiment of the subject matter of the present invention. On receiving a request to spawn a new VM, SDN controller sends a request to the orchestrator to spawn a new VM, $VM_N$. The SDN controller is further adapted to add the domain name of a NTP demon, into a configuration file which is located as per NTP behavior, with which the spawned VM(s) will synchronize its time. Previously all the existing VMs ($VM_1$, $VM_2$, ... $VM_{N-1}$) synchronized their time from a NTP demon ntpd1. If the number of VM(s) synchronizing their time from the available ntpds is under a specified limit, the spawned VM, $VM_N$ will synchronize its time with the available NTP demon, a ntpd, with the specific domain name, ntpd1, as provided in the configuration file by the SDN. On receiving a request from the newly spawned VM, DHCP allocates an available IP address to the newly spawned VM. $VM_N$ further sends a DNS query for the NTP server with which spawned VM will synchronize its time. The DNS resolves the domain name of the NTP server and sends the IP address of the ntpd with which time synchronization is to be performed. $VM_N$ further sends a time synchronization request packet to the IP address of the available NTP demon as resolved by the DNS, ntpd1, as per the domain name provided in the configuration file, which synchronizes its time with the gateway and synchronizes its time with the already available spawned ntpd, ntpd1.

In another embodiment, if all the ntpds available have reached their maximum limit of the number of VMs which can synchronize time from them, the SDN controller requests the orchestrator to spawn a new ntpd demon, ntpd2. The domain name of the newly spawned ntpd, ntpd2 is provided in the configuration file. On receiving confirmation after spawning of the new VM, $VM_N$ and new ntpd, ntpd2, from the orchestrator, the SDN controller controls the number of VM(s) that synchronizes time with the specific ntpd, thereby providing better load balancing. DHCP allocates an available IP address to the newly spawned VM, on receiving a request from the newly spawned VM. $VM_N$ further sends a DNS query for the NTP server with which spawned VM will synchronize its time. The DNS resolves the domain name of the NTP server and sends the IP address of the ntpd with which time synchronization is to be performed. $VM_N$ further sends a time synchronization request packet to the IP address of the available NTP demon as resolved by the DNS, ntpd2, as per the domain name provided in the configuration file, which synchronizes its time with the gateway and synchronizes its time with the newly spawned ntpd, ntpd2. If the number of clients synchronizing time with a specific ntpd overloads the available ntpds, the SDN controller requests the orchestrator to spawn a new ntpd to facilitate time synchronization of the further spawned VMs, $VM_{N+1}$, $VM_{N+2}$, ... and so on.

Figure 7:
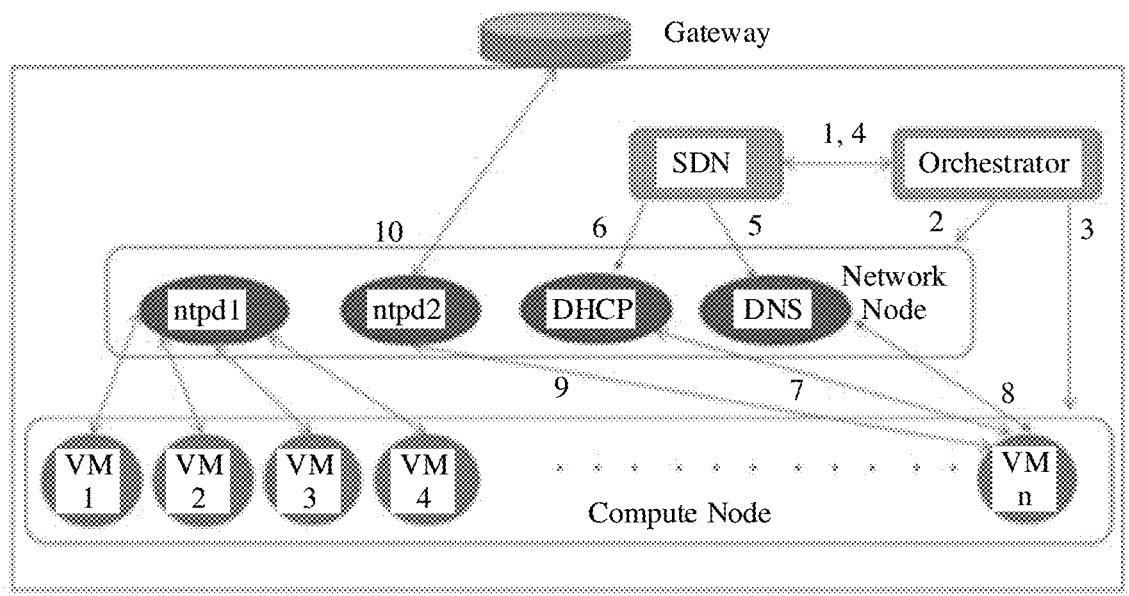
FIGS. 7 and 8 illustrate a schema of a system for time synchronization of a newly added device or a spawned VM in a traditional network, including SDN, wherein automatic deployment of distributed NTP service is done through DHCP, where time synchronization takes place with a gateway.

A system with automatic deployment of distributed NTP service through DHCP has been illustrated in FIG. 7, in accordance to an embodiment of the subject matter of the present invention. On receiving request, the SDN controller sends a request to the orchestrator to spawn a new VM. Upon receiving the request from the SDN controller, the orchestrator spawns a new VM, $VM_N$. Previously all the existing VMs ($VM_1$, $VM_2$, ... $VM_{N-1}$) synchronized their time from a NTP demon ntpd1. If the number of VM(s) synchronizing their time from the available ntpds is under a specified limit, the spawned VM, $VM_N$ will synchronize its time with the available NTP demon, a ntpd, ntpd1, with the specific domain name, as provided by the DHCP server. With the spawning of $VM_N$, SDN controller requests the DHCP server to provide IP address information to spawned VM. The spawned VM, $VM_N$ requests DHCP server using DHCP client running in it to allocate a new IP address to it. DHCP server allocates an available IP address configured for the given network. Simultaneously the DHCP further sends the domain name information of the available NTP demon process, ntpd1, with which $VM_N$ can synchronize its time. $VM_N$ sends a DNS query for the NTP server, and on resolving the domain name, DNS sends the IP address of the available NTP demon process, a ntpd, ntpd1. The spawned VM executes the packet sent by the DHCP server and synchronizes its time accordingly with ntpd1. The spawned NTP demons synchronize their time with the gateway. If the number of clients synchronizing time with a specific ntpd overloads the ntpd, the SDN controller requests the orchestrator to spawn a new ntpd to facilitate time synchronization of the further spawned VMs, $VM_{N+1}$, $VM_{N+2}$, ... and so on.

In another embodiment, if all the ntpds available have reached their maximum limit of the number of VMs which can synchronize time from them, the SDN controller requests the orchestrator to spawn a new ntpd demon, ntpd2. The domain name of the newly spawned ntpd, ntpd2 is provided by the DHCP server. On receiving confirmation after spawning of the new VM, $VM_N$ and new ntpd, ntpd2, from the orchestrator, the SDN controller controls the number of VM(s) that synchronizes time with the specific ntpd, thereby providing better load balancing. SDN controller further provides domain name for IP address mapping in DNS server. With the spawning of $VM_N$, SDN controller further requests the DHCP server to provide IP address information to $VM_N$. DHCP allocates an available IP address to the newly spawned VM, on receiving a request from the newly spawned VM, $VM_N$. Simultaneously the DHCP further sends the domain name information of the available, newly spawned NTP demon process, ntpd2, with which $VM_N$ can synchronize its time. $VM_N$ sends a DNS query for the NTP server, and on resolving the domain name, DNS sends the IP address of the newly spawned NTP demon process, ntpd2. The spawned VM executes the packet sent by the DHCP server and synchronizes its time accordingly with ntpd2. The spawned NTP demons synchronize their time with the gateway. If the number of clients synchronizing time with a specific ntpd overloads the ntpd, the SDN controller requests the orchestrator to spawn a new ntpd to facilitate time synchronization of the further spawned VMs, $VM_{N+1}$, $VM_{N+2}$, ... and so on.

Figure 8:
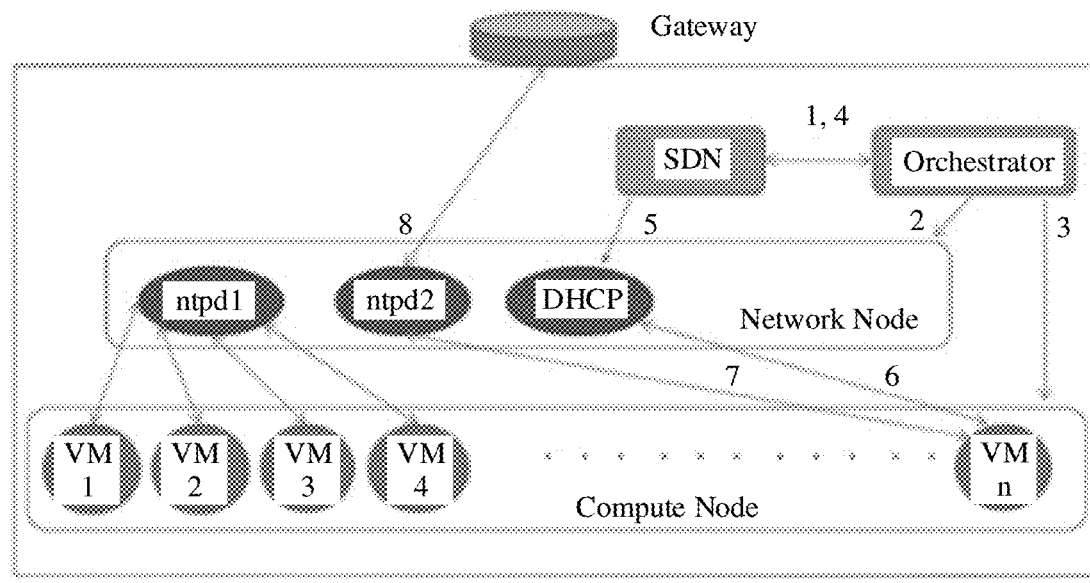

Referring to FIG. 8, illustrating a system with automatic deployment of distributed NTP service through DHCP in accordance to an embodiment of the subject matter of the present invention. On receiving request, the SDN controller sends a request to the orchestrator to spawn a new VM. Upon receiving the request from the SDN controller, the orchestrator spawns a new VM, $VM_N$. Previously all the existing VMs ($VM_1$, $VM_2$, ... $VM_{N-1}$) synchronized their time from a NTP demon ntpd1. If the number of VM(s) synchronizing their time from the available ntpds is under a specified limit, the spawned VM, $VM_N$ will synchronize its time with the available NTP demon, a ntpd, ntpd1, with the specific IP address, as provided by the DHCP server. With the spawning of $VM_N$, SDN controller requests the DHCP server to provide IP address information to spawned VM. The spawned VM, $VM_N$ requests DHCP server using DHCP client running in it to allocate a new IP address to it. DHCP server allocates an available IP address configured for the given network. Simultaneously the DHCP further sends the IP address of the available NTP demon process, ntpd1, with which $VM_N$ can synchronize its time. $VM_N$ sends a time request packet to the specific ntpd, ntpd1 and synchronizes its time accordingly with ntpd1 The NTP demons synchronize their time with the gateway. If the number of clients synchronizing time with a specific ntpd overloads the ntpd, the SDN controller requests the orchestrator to spawn a new ntpd to facilitate time synchronization of the further spawned VMs, $VM_{N+1}$, $VM_{N+2}$, ... and so on.

In another embodiment, if all the ntpds available have reached their maximum limit of the number of VMs which can synchronize time from them, the SDN controller requests the orchestrator to spawn a new ntpd demon, ntpd2. The IP address of the newly spawned NTP demon, ntpd2 is provided by the DHCP server. On receiving confirmation after spawning of the new VM, $VM_N$ and new ntpd, ntpd2, from the orchestrator, the SDN controller controls the number of VM(s) that synchronizes time with the specific ntpd, thereby providing better load balancing. With the spawning of $VM_N$, SDN controller further requests the DHCP server to provide IP address information to $VM_N$. DHCP allocates an available IP address to the newly spawned VM, on receiving a request from the newly spawned VM, $VM_N$. Simultaneously the DHCP further sends the IP address of the available, newly spawned NTP demon process, ntpd2, with which $VM_N$ can synchronize its time. The spawned VM executes the packet sent by the DHCP server and $VM_N$ sends a time request packet to the specific ntpd, ntpd2 and synchronizes its time accordingly with ntpd2. The spawned NTP demons synchronize their time with the gateway. If the number of clients synchronizing time with a specific ntpd overloads the ntpd, the SDN controller requests the orchestrator to spawn a new ntpd to facilitate time synchronization of the further spawned VMs, $VM_{N+1}$, $VM_{N+2}$, ... and so on.

Figure 9:
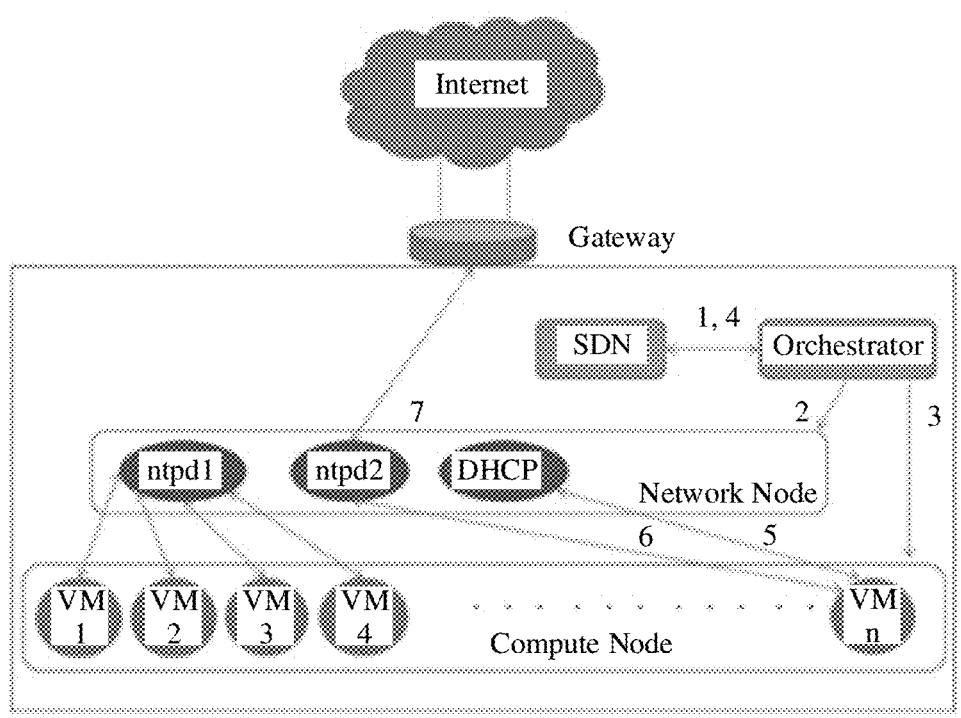
FIGS. 9 and 10 illustrate a schema of a system for time synchronization of a newly added device or a spawned VM in a traditional network, including SDN, wherein automatic deployment of distributed NTP service is done through a configuration file provided by SDN, where time synchronization takes place with an external time source present over the internet or gateway.

Referring to FIG. 9, illustrating a system with automatic deployment of distributed NTP service through a configuration file provided by SDN, in accordance to an embodiment of the subject matter of the present invention. On receiving a request to spawn a new VM, SDN controller sends a request to the orchestrator to spawn a new VM, $VM_N$. The SDN controller is further adapted to send the IP address of a NTP demon, in the form a configuration file, with which the spawned VM(s) will synchronize its time. Previously all the existing VMs ($VM_1$, $VM_2$, ... $VM_{N-1}$) synchronized their time from a NTP demon ntpd1. If the number of VM(s) synchronizing their time from the available ntpds is under a specified limit, the spawned VM synchronizes its time with the IP address of the available NTP server, a ntpd, ntpd1. DHCP allocates an available IP address to the newly spawned VM, on receiving a request from the newly spawned VM. $VM_N$ further sends a time synchronization request packet to the IP address of the available NTP demon, ntpd1, provided in the configuration file, which synchronizes its time with an external standard time source and $VM_N$ synchronizes its time with the already available spawned ntpd, ntpd1.

In another embodiment, if all the ntpds available have reached their maximum limit of the number of VMs which can synchronize time from them, the SDN controller requests the orchestrator to spawn a new ntpd demon, ntpd2. The IP address of the ntpd2 is provided in the configuration file. On receiving confirmation after spawning of the new VM, VMN and new ntpd, ntpd2, from the orchestrator, the SDN controller controls the number of VM(s) that synchronizes time with the specific ntpd, thereby providing better load balancing. DHCP allocates an available IP address to the newly spawned VM, on receiving a request from the newly spawned VM. VMN further sends a time synchronization request packet to the IP address of the newly spawned NTP demon provided in the configuration file, ntpd2, which synchronizes its time with an external standard time source and synchronizes its time accordingly with the newly spawned ntpd, ntpd2. If the number of clients synchronizing time with a specific ntpd overloads the available ntpds, the SDN controller requests the orchestrator to spawn a new ntpd to facilitate time synchronization of the further spawned VMs, $VM_{N+1}$, $VM_{N+2}$, ... and so on.

Figure 10:
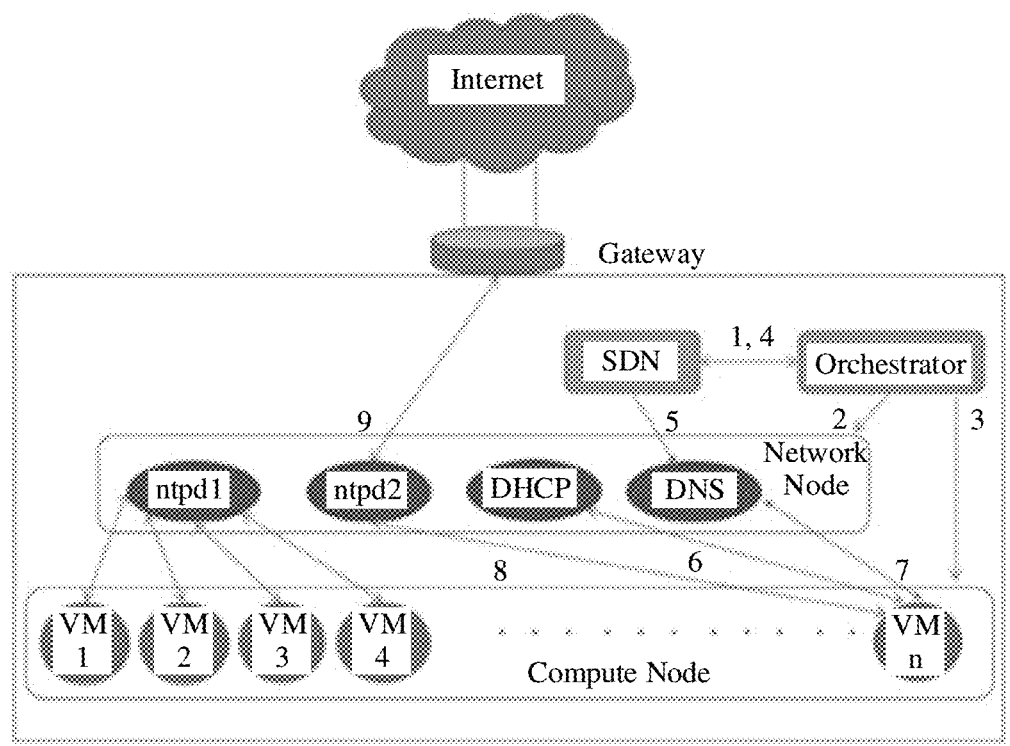

A system with automatic deployment of distributed NTP service, through a configuration file provided by SDN, has been illustrated in FIG. 10, in accordance to an embodiment of the subject matter of the present invention. On receiving a request to spawn a new VM, SDN controller sends a request to the orchestrator to spawn a new VM, VMN. The SDN controller is further adapted to send the domain name of a NTP demon, in the form a configuration file, with which the spawned VM(s) will synchronize its time. Previously all the existing VMs ($VM_1$, $VM_2$, ... $VM_{N-1}$) synchronized their time from a NTP demon ntpd1. If the number of VM(s) synchronizing their time from the available ntpds is under a specified limit, the spawned VM, VMN will synchronize its time with the available NTP demon, a ntpd, with the specific domain name, ntpd1, as provided in the configuration file by the SDN. On receiving a request from the newly spawned VM, DHCP allocates an available IP address to the newly spawned VM. VMN further sends a DNS query for the NTP server with which spawned VM will synchronize its time. The DNS resolves the domain name of the NTP server and sends the IP address of the ntpd with which time synchronization is to be performed. VMN further sends a time synchronization request packet to the IP address of the available NTP demon as resolved by the DNS, ntpd1, as per the domain name provided in the configuration file, which synchronizes its time with an external standard time source and synchronizes its time with the already available spawned ntpd, ntpd1.

In another embodiment, if all the ntpds available have reached their maximum limit of the number of VMs which can synchronize time from them, the SDN controller requests the orchestrator to spawn a new ntpd demon, ntpd2. The domain name of the newly spawned ntpd, ntpd2 is provided in the configuration file. On receiving confirmation after spawning of the new VM, VMN and new ntpd, ntpd2, from the orchestrator, the SDN controller controls the number of VM(s) that synchronizes time with the specific ntpd, thereby providing better load balancing. DHCP allocates an available IP address to the newly spawned VM, on receiving a request from the newly spawned VM. VMN further sends a DNS query for the NTP server with which spawned VM will synchronize its time. The DNS resolves the domain name of the NTP server and sends the IP address of the ntpd with which time synchronization is to be performed. VMN further sends a time synchronization request packet to the IP address of the available NTP demon as resolved by the DNS, ntpd2, as per the domain name provided in the configuration file, which synchronizes its time with an external standard time source and synchronizes its time with the newly spawned ntpd, ntpd2. If the number of clients synchronizing time with a specific ntpd overloads the available ntpds, the SDN controller requests the orchestrator to spawn a new ntpd to facilitate time synchronization of the further spawned VMs, $VM_{N+1}$, $VM_{N+2}$, ... and so on.

Figure 11:
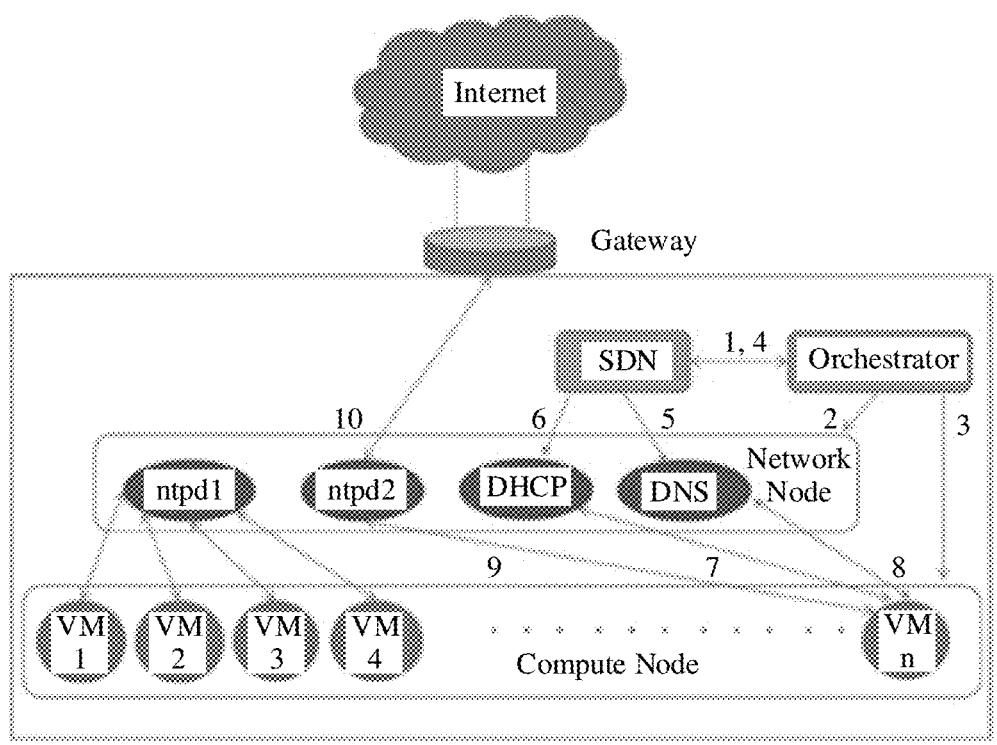
FIGS. 11 and 12 illustrate a schema of a system for time synchronization of a newly added device or a spawned VM in a traditional network, including SDN, wherein automatic deployment of distributed NTP service is done through DHCP, where time synchronization takes place with an external time source present over the internet or the gateway.

A system with automatic deployment of distributed NTP service through DHCP has been illustrated in FIG. 11, in accordance to an embodiment of the subject matter of the present invention. On receiving request, the SDN controller sends a request to the orchestrator to spawn a new VM. Upon receiving the request from the SDN controller, the orchestrator spawns a new VM, VMN. Previously all the existing VMs ($VM_1$, $VM_2$, ... $VM_{N-1}$) synchronized their time from a NTP demon ntpd1. If the number of VM(s) synchronizing their time from the available ntpds is under a specified limit, the spawned VM, VMN will synchronize its time with the available NTP demon, a ntpd, ntpd1, with the specific domain name, as provided by the DHCP server. With the spawning of VMN, SDN controller requests the DHCP server to provide IP address information to spawned VM. The spawned VM, VMN requests DHCP server using DHCP client running in it to allocate a new IP address to it. DHCP server allocates an available IP address configured for the given network. Simultaneously the DHCP further sends the domain name information of the available NTP demon process, ntpd1, with which VMN can synchronize its time. VMN sends a DNS query for the NTP server, and on resolving the domain name, DNS sends the IP address of the available NTP demon process, a ntpd, ntpd1. The spawned VM executes the packet sent by the DHCP server and synchronizes its time accordingly with ntpd1. The spawned NTP demons synchronize their time with an external standard time source. If the number of clients synchronizing time with a specific ntpd overloads the ntpd, the SDN controller requests the orchestrator to spawn a new ntpd to facilitate time synchronization of the further spawned VMs, $VM_{N+1}$, $VM_{N+2}$, . . . and so on.

In another embodiment, if all the ntpds available have reached their maximum limit of the number of VMs which can synchronize time from them, the SDN controller requests the orchestrator to spawn a new ntpd demon, ntpd2. The domain name of the newly spawned ntpd, ntpd2 is provided by the DHCP server. On receiving confirmation after spawning of the new VM, VMN and new ntpd, ntpd2, from the orchestrator, the SDN controller controls the number of VM(s) that synchronizes time with the specific ntpd, thereby providing better load balancing. SDN controller further provides domain name for IP address mapping in DNS server. With the spawning of VMN, SDN controller further requests the DHCP server to provide IP address information to VMN. DHCP allocates an available IP address to the newly spawned VM, on receiving a request from the newly spawned VM, VMN. Simultaneously the DHCP further sends the domain name information of the available, newly spawned NTP demon process, ntpd2, with which VMN can synchronize its time. VMN sends a DNS query for the NTP server, and on resolving the domain name, DNS sends the IP address of the newly spawned NTP demon process, ntpd2. The spawned VM executes the packet sent by the DHCP server and synchronizes its time accordingly with ntpd2. The spawned NTP demons synchronize their time with an external standard time source. If the number of clients synchronizing time with a specific ntpd overloads the ntpd, the SDN controller requests the orchestrator to spawn a new ntpd to facilitate time synchronization of the further spawned VMs, VMN+1, VMN+2, . . . and so on.

Figure 12:
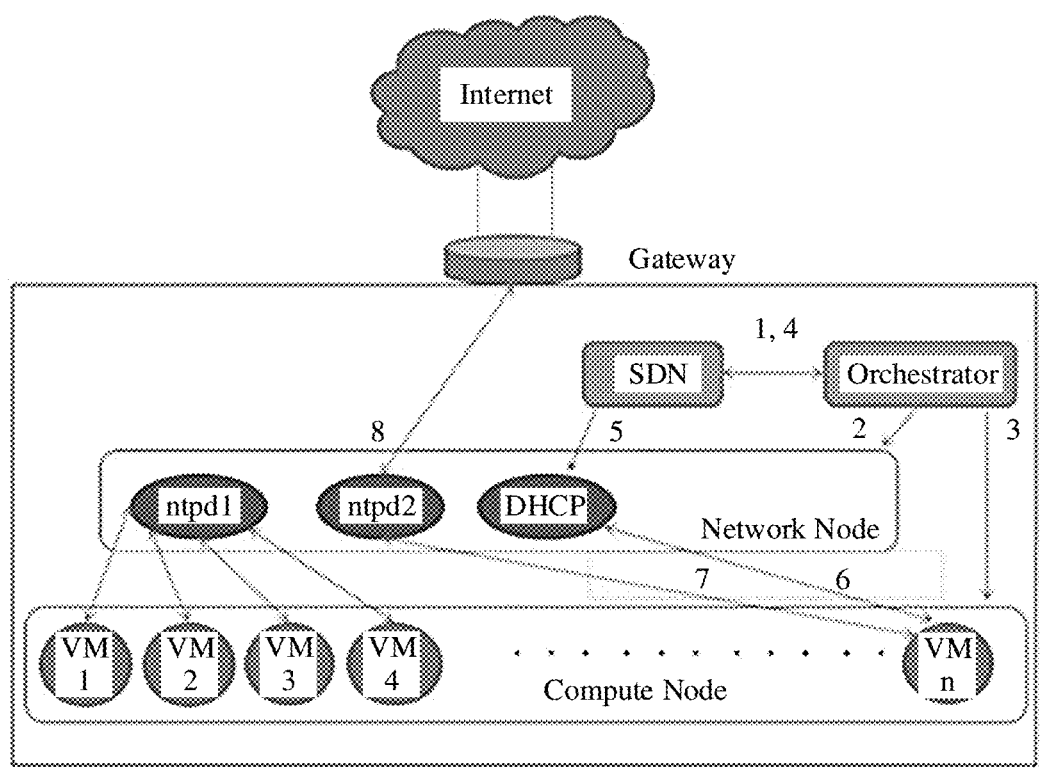

Referring to FIG. 12, illustrating a system with automatic deployment of distributed NTP service through DHCP in accordance to an embodiment of the subject matter of the present invention. On receiving request, the SDN controller sends a request to the orchestrator to spawn a new VM. Upon receiving the request from the SDN controller, the orchestrator spawns a new VM, VMN. Previously all the existing VMs ($VM_1$, $VM_2$, . . . $VM_{N-1}$) synchronized their time from a NTP demon ntpd1. If the number of VM(s) synchronizing their time from the available ntpds is under a specified limit, the spawned VM, VMN will synchronize its time with the available NTP demon, a ntpd, ntpd1, with the specific IP address, as provided by the DHCP server. With the spawning of VMN, SDN controller requests the DHCP server to provide IP address information to spawned VM. The spawned VM, VMN requests DHCP server using DHCP client running in it to allocate a new IP address to it. DHCP server allocates an available IP address configured for the given network. Simultaneously the DHCP further sends the IP address of the available NTP demon process, ntpd1, with which VMN can synchronize its time. VMN sends a time request packet to the specific ntpd, ntpd1 and synchronizes its time accordingly with ntpd1. The NTP demons synchronize their time with an external standard time source. If the number of clients synchronizing time with a specific ntpd overloads the ntpd, the SDN controller requests the orchestrator to spawn a new ntpd to facilitate time synchronization of the further spawned VMs, $VM_{N+1}$, $VM_{N+2}$, . . . and so on.

In further another embodiment, if all the ntpds available have reached their maximum limit of the number of VMs which can synchronize time from them, the SDN controller requests the orchestrator to spawn a new ntpd demon, ntpd2. The IP address of the newly spawned NTP demon, ntpd2 is provided by the DHCP server. On receiving confirmation after spawning of the new VM, VMN and new ntpd, ntpd2, from the orchestrator, the SDN controller controls the number of VM(s) that synchronizes time with the specific ntpd, thereby providing better load balancing. With the spawning of VMN, SDN controller further requests the DHCP server to provide IP address information to VMN. DHCP allocates an available IP address to the newly spawned VM, on receiving a request from the newly spawned VM, VMN. Simultaneously the DHCP further sends the IP address of the available, newly spawned NTP demon process, ntpd2, with which VMN can synchronize its time. The spawned VM executes the packet sent by the DHCP server and VMN sends a time request packet to the specific ntpd, ntpd2 and synchronizes its time accordingly with ntpd2. The spawned NTP demons synchronize their time with an external standard time source. If the number of clients synchronizing time with a specific ntpd overloads the ntpd, the SDN controller requests the orchestrator to spawn a new ntpd to facilitate time synchronization of the further spawned VMs, $VM_{N+1}$, $VM_{N+2}$, . . . and so on.

Figure 13:
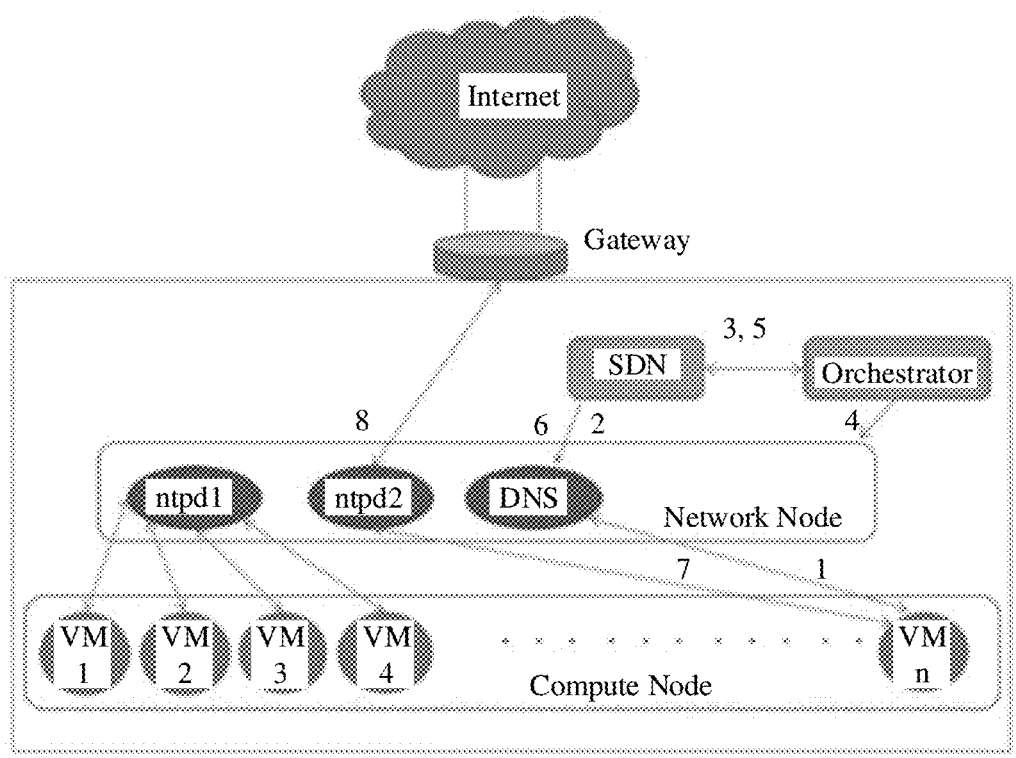
FIG. 13 illustrates a schema of a system for time synchronization of a newly added device or a spawned VM in a traditional network, including SDN, wherein automatic deployment of distributed NTP service is done through DNS, where the VM changes its source of time synchronization.

Referring to FIG. 13, illustrating a system with automatic deployment of distributed NTP service through DNS, in accordance to an embodiment of the subject matter of the present invention. The newly added devices or spawned VMs request to synchronize their time with external time source, a standard NTP server over the internet or an external time source present over the gateway. In order to synchronize time, newly spawned VMs request to synchronize its time with an external time source, like time source 1. VM needs to resolve the IP address of the external time source 1 prior to its time synchronization. The DNS server on receiving the IP resolution packet finds that the address with which time synchronization is to be done is a time source 1 present over the internet or external time source present over the gateway. DNS further compares whether any of the existing spawned ntpds synchronize their time with the corresponding external time source, as requested by the spawned VM. Once it finds the entry of existing ntpd for time source 1, DNS will pass IP address of that ntpd to newly spawned VM and the VM synchronizes its time with the corresponding ntpd which has already synchronized its time with external time source 1. If the number of clients synchronizing time with a specific ntpd overloads the ntpd, the SDN controller requests the orchestrator to spawn a new ntpd to facilitate time synchronization of the further spawned VMs, $VM_{N+1}$, $VM_{N+2}$, . . . and so on.

In another embodiment of the present invention, after comparison of whether any of the existing spawned ntpds synchronize their time with the corresponding external time source, as requested by the spawned VM, DNS finds there is no existing ntpds synchronizing their time with the external time source with which the VM has requested to synchronize time with and informs SDN about the non-existence of ntpds synchronizing their time with the external time source with which the VM has requested to synchronize time with. The SDN controller thus sends a request to the orchestrator to spawn a new ntpd synchronizing time with the requested external time source, present over the internet or the gateway. After spawning of the new ntpd, SDN sends the information to the DNS, which resolves the IP address of the newly spawned ntpd and sends the IP address of the newly spawned ntpd to the VM. VM synchronizes its time with the corresponding newly spawned ntpd which synchronizes its time with the requested external time source present over the internet or the gateway. The IP address of the spawned ntpd is added in to the DNS proxy entry by the SDN controller. SDN controller is further configured to provide IP address of the ntpd to any DNS query made for standard time source, by the NTP clients. Thus all the NTP clients requesting to synchronizing their time with external standard time source will synchronize their time with ntpd. If the number of clients synchronizing time with a specific ntpd overloads the ntpd, the SDN controller requests the orchestrator to spawn a new ntpd to facilitate time synchronization of the further spawned VMs, $VM_{N+1}$, $VM_{N+2}$, ... and so on.

In another embodiment of the present invention, if the number of NTP clients that can synchronize time with a NTP demon is above a maximum limit, new NTP demon, ntpd is spawned by the orchestrator on request from the SDN controller. After spawning of the new ntpd, SDN sends the information to the DNS, which resolves the IP address of the newly spawned ntpd and sends the IP address to the VM. The VM synchronizes its time with the corresponding newly spawned ntpd which synchronizes its time with the requested external time source present over the internet or the gateway. The IP address of the spawned ntpd is added in to the DNS proxy entry by the SDN controller. SDN controller is further configured to provide IP address of the ntpd to any DNS query made for standard time source, by the NTP clients. Thus all the NTP clients requesting to synchronizing their time with external standard time source will synchronize their time with ntpd1. If the number of clients synchronizing time with a specific ntpd overloads the ntpd, the SDN controller requests the orchestrator to spawn a new ntpd to facilitate time synchronization of the further spawned VMs, $VM_{N+1}$, $VM_{N+2}$, ... and so on.

A person skilled in the art may understand that any known or new algorithms by be used for the implementation of the present invention. However, it is to be noted that, the present invention provides a method to achieve the above mentioned benefits and technical advancement irrespective of using any known or new algorithms.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or software depends on the particular inventions and design constraint conditions of the technical solution. A person skilled in the art may use different methods to implement the described functions for each particular invention, but it should not be considered that the implementation goes beyond the scope of the present invention.

In the several embodiments provided in the present invention, it should be understood that the disclosed system and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer node (which may be a personal computer, a server, or a network node) to perform all or a part of the steps of the methods described in the embodiment of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

Devices that are in communication with each other need not be in continuous communication with each other, unless expressly specified otherwise. In addition, devices that are in communication with each other may communicate directly or indirectly through one or more intermediaries.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Although implementations for system and method for effective time synchronization of NTP clients in a traditional network, including SDN, have been described in language specific to structural features and/or methods, it is to be understood that the appended claims are not necessarily limited to the specific features or methods described. Rather, the specific features and methods are disclosed as examples of implementations of the system and method for effective time synchronization of NTP clients in a traditional network, including SDN.

What is claimed is:

1. A method, comprising:
   obtaining, by at least one Network Time Protocol (NTP) client in a computing node, an internet protocol (IP) address of a spawned NTP daemon (ntpd) or a domain name of the spawned ntpd to synchronize time with; and synchronizing, by the at least one NTP client, time of the least one NTP client with time of the spawned ntpd without the at least one NTP client accessing a gateway of a network, wherein the time of the spawned ntpd is synchronized with the gateway of the network or synchronized with an external time source present over the Internet, wherein the gateway provides Internet access to the at least one NTP client and the spawned ntpd, wherein the at least one NTP client and the spawned ntpd are on a same side of the gateway, wherein a same Dynamic Host Control Protocol (DHCP) server serves the at least one NTP client and the spawned ntpd, wherein the at least one NTP client is at least one virtual machine (VM) of a first set of VMs, wherein the spawned ntpd time synchronizes with the first set of VMs, wherein the spawned ntpd is one ntpd of a plurality of spawned ntpds including a second spawned ntpd time synchronizing with a second set of VMs, wherein the first set of VMs and the second set of VMs are spawned by a Software Defined Network (SDN) controller and running on the computing node, and wherein the spawned ntpd and the second spawned ntpd are spawned by the SDN controller and running on a second computing node.

2. The method of claim 1, further comprising:
obtaining, by the at least one NTP client, an available IP address from the same DHCP server in a network node.

3. The method of claim 2, the obtaining the IP address or the domain name comprising:
receiving, by the at least one NTP client, the IP address or the domain name of the spawned ntpd from a configuration file provided by the SDN controller or from the same DHCP server.

4. The method of claim 3, further comprising:
when the domain name of the spawned ntpd is received by the at least one NTP client:
obtaining, by the at least one NTP client, the IP address of the spawned ntpd from a Domain Name System (DNS) server in the network node upon sending a DNS query for a NTP server.

5. The method of claim 4, wherein the domain name of the spawned ntpd is provided for IP address mapping in the DNS server by the SDN controller.

6. The method of claim 1, wherein at least one ntpd is spawned by the SDN controller or an orchestrator when existing ntpds get overloaded by time synchronization requests from NTP clients.

7. The method of claim 1, the spawned ntpd running in a device different from the gateway.

8. A method, comprising:
requesting, by at least one Network Time Protocol (NTP) client in a computing node, to synchronize time with an external time source present over the Internet or with a gateway in a network;
sending, by the at least one NTP client, an internet protocol (IP) resolution packet to a Domain Name System (DNS) server in a network node, to resolve an IP address of the external time source;
obtaining, by the at least one NTP client from the DNS server, an IP address of a time source to synchronize time with; and
synchronizing, by the at least one NTP client, time of the least one NTP client with the time source without the at least one NTP client accessing the gateway of the network, wherein the IP address of the time source received from the DNS server is of a spawned NTP daemon (ntpd), and wherein the spawned ntpd synchronizes time with the external time source present over the Internet or with the gateway, wherein the gateway provides Internet access to the at least one NTP client and the spawned ntpd, wherein the at least one NTP client and the spawned ntpd are on a same side of the gateway, wherein a same Dynamic Host Control Protocol (DHCP) server serves the at least one NTP client and the spawned ntpd, wherein the at least one NTP client is at least one virtual machine (VM) of a first set of VMs, wherein the spawned ntpd time synchronizes with the first set of VMs, wherein the spawned ntpd is one ntpd of a plurality of spawned ntpds including a second spawned ntpd time synchronizing with a second set of VMs, wherein the first set of VMs and the second set of VMs are spawned by a Software Defined Network (SDN) controller and running on the computing node, and wherein the spawned ntpd and the second spawned ntpd are spawned by the SDN controller and running on a second computing node.

9. The method of claim 8, wherein at least one spawned ntpd is spawned by the SDN controller or an orchestrator.

10. The method of claim 9, wherein the spawned ntpd is spawned when NTP clients request for time synchronization with different external time sources.

11. The method of claim 9, wherein the spawned ntpd is spawned when existing ntpds get overloaded by time synchronization requests from NTP clients.

12. A system, comprising:
a computing node;
a gateway device; and
a processor adapted to execute instructions, wherein the processor and the gateway device is communicably coupled to cooperate, such that the system is configured for:
obtaining, by at least one Network Time Protocol (NTP) client in the computing node, an internet protocol (IP) address of a spawned NTP daemon (ntpd) or a domain name of the spawned ntpd, to synchronize time with; and
synchronizing time of the at least one NTP client with time of the spawned ntpd without the at least one NTP client accessing the gateway device,
wherein the spawned ntpd synchronizes time with the gateway device or an external source present over the Internet, wherein the gateway device provides Internet access to the at least one NTP client and the spawned ntpd, wherein the at least one NTP client and the spawned ntpd are on a same side of the gateway device, wherein a same Dynamic Host Control Protocol (DHCP) server serves the at least one NTP client and the spawned ntpd, wherein the at least one NTP client is at least one virtual machine (VM) of a first set of VMs, wherein the spawned ntpd time synchronizes with the first set of VMs, wherein the spawned ntpd is one ntpd of a plurality of spawned ntpds including a second spawned ntpd time synchronizing with a second set of VMs, wherein the first set of VMs and the second set of VMs are spawned by a Software Defined Network (SDN) controller and running on the computing node, and wherein the spawned ntpd and the second spawned ntpd are spawned by the SDN controller and running on a second computing node.

13. The system of claim 12, the system is further configured for:
   obtaining, by at least one NTP client, an available IP address from the same DHCP server in a network node.
14. The system of claim 13, the obtaining the IP address or the domain name comprising:
   obtaining, by the at least one NTP client, the IP address or the domain name of the spawned ntpd from a configuration file provided by the SDN controller, or from the same DHCP server.
15. The system of claim 14, the system is further configured for:
   when the domain name of the spawned ntpd is received by the at least one NTP client:
      obtaining, by the NTP client, the IP address of the spawned ntpd from a Domain Name System (DNS) server in the network node upon sending a DNS query for a NTP server.
16. The system of claim 15, wherein the domain name of the spawned ntpd is provided for IP address mapping in the DNS server by the SDN controller.
17. The system of claim 12, wherein at least one ntpd is spawned by the SDN controller or an orchestrator when existing ntpds get overloaded by time synchronization requests from NTP clients.
18. A system comprising:
   a computing node;
   a gateway device;
   at least one external standard time source; and
   a processor adapted to execute instructions, wherein the processor, the gateway device and the external standard time source is communicably coupled to cooperate, such that the system is configured for:
      requesting, by at least one Network Time Protocol (NTP) client in the computing node, to synchronize time with at least one external standard time source, over internet;
      sending, by the at least one NTP client, an internet protocol (IP) resolution packet to a Domain Name System (DNS) server in a network node to resolve an IP address of the external standard time source;
      obtaining, by the at least one NTP client from the DNS server, an IP address of a time source to synchronize time with; and
      synchronizing, by the at least one NTP client, time with the time source without the at least one NTP client accessing the gateway device,
      wherein the IP address of the time source received from the DNS server is of a spawned NTP daemon (ntpd), and wherein the spawned ntpd synchronizes time with the standard external time source present over the Internet or with the gateway device, wherein the gateway device provides Internet access to the at least one NTP client and the spawned ntpd, wherein the at least one NTP client and the spawned ntpd are on a same side of the gateway device, wherein a same Dynamic Host Control Protocol (DHCP) server serves the at least one NTP client and the spawned ntpd, wherein the at least one NTP client is at least one virtual machine (VM) of a first set of VMs, wherein the spawned ntpd time synchronizes with the first set of VMs, wherein the spawned ntpd is one ntpd of a plurality of spawned ntpds including a second spawned ntpd time synchronizing with a second set of VMs, wherein the first set of VMs and the second set of VMs are spawned by a Software Defined Network (SDN) controller and running on the computing node, and wherein the spawned ntpd and the second spawned ntpd are spawned by the SDN controller and running on a second computing node.
19. The system of claim 18, wherein at least one spawned ntpd is spawned by the SDN controller or an orchestrator.
20. The system of claim 18, wherein the spawned ntpd is spawned when NTP clients request for time synchronization with different external time sources.
21. The system of claim 18, wherein the spawned ntpd is spawned when existing ntpds get overloaded by time synchronization requests from NTP clients.

\* \* \* \* \*